May 28, 1968 G. HEYL ET AL 3,385,264
APPARATUS BY MEANS OF WHICH PARTICLES MAY BE APPLIED
TO MOULDINGS AGAINST THE INFLUENCE OF GRAVITY
Filed Feb. 28, 1966 3 Sheets-Sheet 1

INVENTORS:
GERHARD HEYL, GÜNTER LÜTTGENS, FRIEDRICH REICH, ANTON SCHMITZ, HEINZ LUDWIG.

BY Burgess, Dinklage & Sprung

ATTORNEYS

May 28, 1968 G. HEYL ETAL 3,385,264
APPARATUS BY MEANS OF WHICH PARTICLES MAY BE APPLIED
TO MOULDINGS AGAINST THE INFLUENCE OF GRAVITY
Filed Feb. 28, 1966 3 Sheets-Sheet 2

INVENTORS:
GERHARD HEYL, GÜNTER LÜTTGENS, FRIEDRICH REICH, ANTON SCHMITZ, HEINZ LUDWIG.

BY Burgess, Dinklage & Sprung

ATTORNEYS

INVENTORS:
GERHARD HEYL, GÜNTER LÜTTGENS, FRIEDRICH REICH, ANTON SCHMITZ, HEINZ LUDWIG.

United States Patent Office 3,385,264
Patented May 28, 1968

3,385,264
APPARATUS BY MEANS OF WHICH PARTICLES MAY BE APPLIED TO MOULDINGS AGAINST THE INFLUENCE OF GRAVITY
Gerhard Heyl, Cologne, Stammheim, Gunter Luttgens, Leverkusen, Friedrich Reich, Leverkusen-Bayerwerk, Anton Schmitz, Krefeld-Uerdingen, and Heinz Ludwig, Bamberg, Germany, assignors to Farbenfabriken Bayer Aktiengesellschaft, Leverkusen, Germany, a corporation of Germany
Filed Feb. 28, 1966, Ser. No. 530,568
6 Claims. (Cl. 118—621)

ABSTRACT OF THE DISCLOSURE

Apparatus for applying particles such as flocks to moldings against the influence of gravity including separate flocking zones, earthed conductive particle-carrying belts for travel through appropriate flocking zones, moldings insulated from earth for travel through said zones in spaced above and facing relation to the particular belt portion thereat, and separate means for supplying a different level of high voltage to a given molding solely during passage through a given zone to produce a correspondingly different intensity electric field in each individual zone to cause belt-carried particles to be applied against the influence of gravity to the molding thereat in dependence upon the intensity of such field.

---

This invention relates to an apparatus by means of which particles may be applied to mouldings against the influence of gravity by means of an electric field in which the particles are guided on a belt beneath the moulding to be flocked.

In known apparatus of this kind, the particles, for example the flocks, are supplied on a belt above which high-voltage electrode grids or screens are arranged. The articles to be flocked are located above the electrodes. The flocks are raised from the belt under the influence of the electric field and pass through the electrode on to the article. This method can also be used for flocking mouldings, but unfortunately it has considerable disadvantages. One unescapable drawback is that the flocks raised from the belt pass through the electrode not only on to the mouldings, but also past them on either side. In cases where flocking is carried out successively on a number of mouldings, flocks are raised from the belt carrying the flocks even when there is no moulding at all above them. The flocks which have meanwhile been raised and charged, together with the flocks which fly past the mouldings on either side, cannot be recovered to serve any useful purpose. As a result, the flock wastage on apparatus of this kind is considerable, in consequence of which the flocking operation itself is far from economical. In addition, the flocks which have missed the moulding are deposited on other parts of the apparatus which, as a result, becomes heavily fouled, thus interfering with the actual flocking process.

There is also an apparatus by means of which webs amy be anti-gravitationally flocked in a continuous cycle. In this apparatus, the web passes beneath a high-tension electrode so that the entire web, including all the conveying, feeding and winding machinery, as well as the adhesive-coating station, are at a high potential. This gives rise to considerable difficulties in handling during operation so that systems of this type have not been used on a commercial scale.

The object of the present invention is to devlop an apparatus for applying particles, particularly flocks, to mouldings which does not have the disadvantages referred to above and in which, above all, the high losses and the difficulties previously encountered in the supply of high voltage are avoided.

Accordingly, the invention relates to an apparatus for flock-coating mouldings which comprises a flocking zone with means for supplying a high voltage to a conductive holder for the mouldings which is arranged at a distance above a particle-carrying belt, is insulated from earth and is moved through the flocking zone. As a result, the flocks are raised from the belt only by the mouldings themselves. The flocks which remain on the belt are delivered into a collecting vessel and hence may be re-used without any difficulty.

As the particles are being applied, the moulding itself is moved, for example rotated, in such a way that all those areas of the moulding to be treated are successively turned towards the belt carrying the particles.

In the case of batch flocking, several holders for the mouldings are anchored, with insulation, to an earthed conveyor in such a way that the movement of the conveyor is coupled with the rotation of the mouldings. As a result, the mouldings may be successively guided past a plurality of flocking stations, in which case the direction in which the conveyor moves crosses the direction in which the belt carrying the particles moves. It is, however, possible for the conveyor and the belt carrying the particles to move in opposite directions.

The apparatus according to the invention also comprises means for supplying high voltage to the holders which ensure that, when they are over the belt carrying the particles, the holders are always at a high voltage whilst, in the intervening periods, they are earthed. These means comprise rails which are interrupted by insulators, and may carry high voltage at varying levels or may be earthed, and sliding contacts or contact wheels.

The invention is described below with reference to a hat-flocking plant and is illustrated in the accompanying drawings in which.

Figure 1:
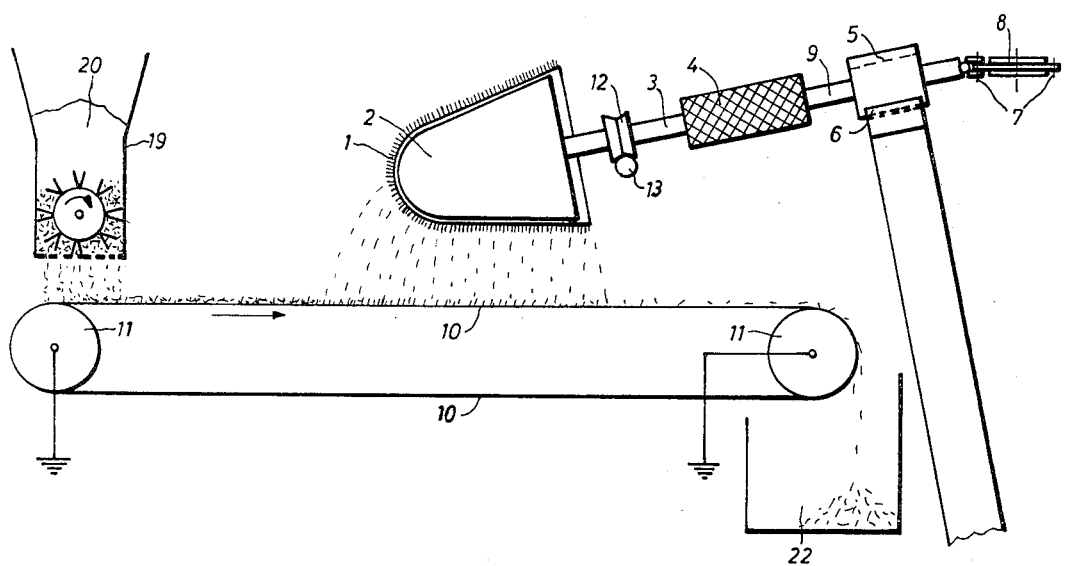
FIGURE 1 illustrates one of the flocking stations in cross-section.

Referring now to the drawings, the hat stump 1 to be flocked is placed on a correspondingly shaped metal holder or support 2. This holder 2 is fixedly connected to a pinion 5 by way of a shaft 3 and an insulator 4. The pinion 5 meshes with a rack 6.

Figure 2:
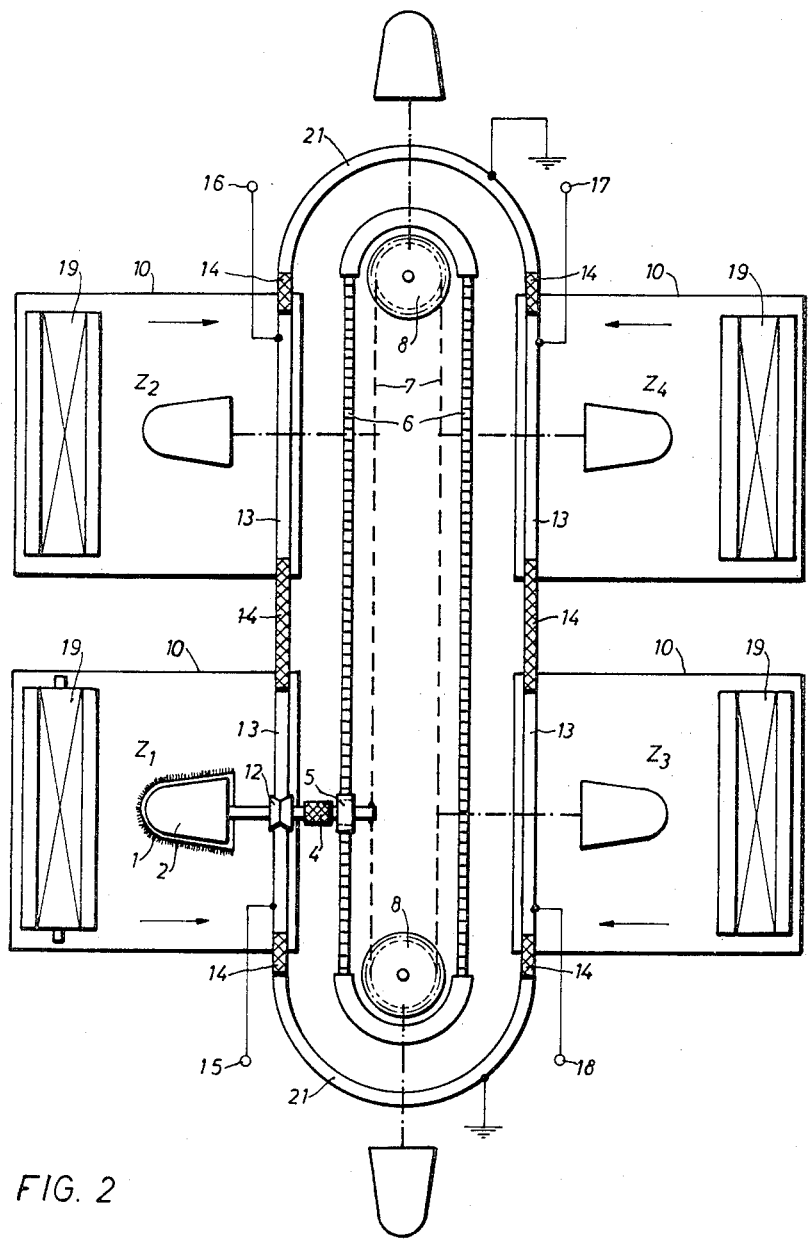
FIGURE 2 shows in plan view a complete flocking plant for bath flocking comprising four flocking stations. In this embodiment, the direction of the belt carrying the flocks crosses that of the conveyor.
Figure 3:
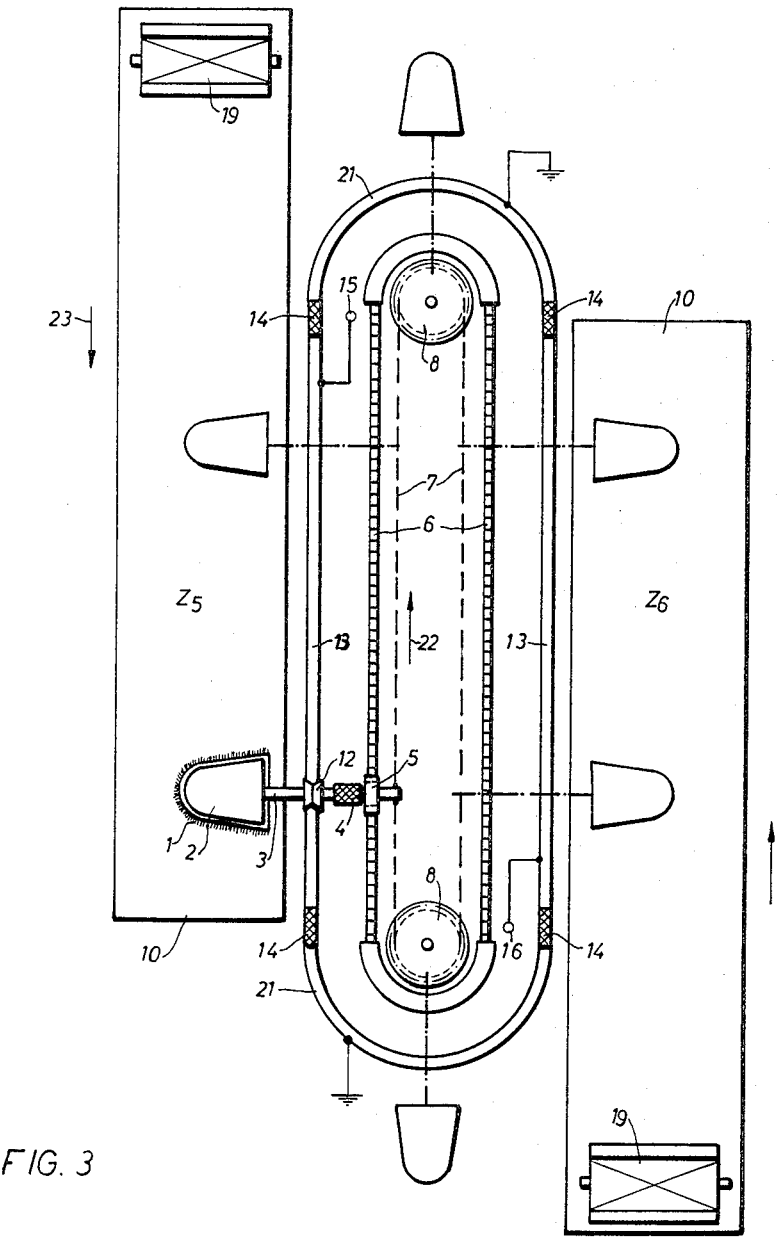
FIGURE 3 illustrates in plan view a complete flocking plant in which the belt carrying the flocks and the conveyor move in opposite directions.

Each of the holders is attached to a conveyor chain 7 driven by a motor (not shown) via chain wheels 8 (FIGURES 2 and 3). In this way, the hat stumps to be flocked are drawn through each flocking zone (Z1, Z2, Z3 and Z4 or Z5 and Z6), rotating under the influence of the rack and pinion. The angle at which the holder is inclined towards the belt 10 carrying the flocks can be adjusted in any desired way so as to produce the required degree of flocking. The flocking zone may be regarded as the space above the conductive belt 10, which is itself earthed through the metal drive rolls 11.

In each flocking zone Z, the metal holder or support 2 and hence the hat stump 1 are contacted with rails 13 carrying a high voltage, by way of contact wheels 12 connected to a shaft 3 and, in this way, are supplied with the high voltage required for the flocking process.

In cases where a moulding is individually flocked, the pinion 5 and the means by which shaft 9 is fastened to the conveyor chain 7, are dispensed with. In this case, the shaft 9 is rotated by a drive system (not shown), and the high voltage is preferably supplied to the support 2 through a sliding contact (not shown).

In cases where it is intended to apply flocks which differ from one another, for example in length and/or thickness and color, different field intensities are used in the separate flocking zones. For this purpose, both the intervals between the belt carrying the flocks and the hat stumps and the high voltages are variable. This is achieved by electrically separating the current-conducting rails 13 between the flocking zones Z by insulators 14, and connecting them by way of lines 15, 16, 17, 18 (FIGURE 2) to different sources of high voltage (not shown). For example, flocks 4 and 10 mm. long may be successively anchored to the hat stumps to be flocked.

It has been found that the most favourable results are obtained when the interval between the belt carrying the flocks and the hat stumps amounts to 20 cm. with flocks 4 mm. long, and 30 cm. with flocks 10 mm. long. In addition, favourable results are obtained when the intensity of the flocking field is around 2 kv./cm. Consequently, a high voltage of 2 kv./cm.×30 cm.=60 kv. has to be applied across the supports carrying the hat stump for the wider gap, whilst the high voltage required for the narrower gap amounts to 2 kv./cm.×20 cm.=40 kv.

The flocks 20 run on to the flock-carrying belt 10 through the flock distributor 19 and are carried into the flocking zone. Since a flocking field can only be formed when a hat stump carrying a high voltage is located above the conveyor belt 10, flocks are only raised beneath the hat stump. Those flocks which are not raised remain on the conveyor belt 10 and are collected in the container 22. The placing on the holders of the hat stumps to be flocked, which have already been coated with adhesive, and the removal of the flocked hat stumps, takes place in the field-free space. For this reason, the current-conducting rail sections 21 are insulated by insulators 14 from the rail sections 13 carrying the high voltage.

In the arrangement shown in FIGURE 3, the hat stumps 2 to be flocked and the belts 10 carrying the flocks move in opposite directions (arrows 22 and 23). Thus, in the case of bath flocking, it is possible by varying the speed of travel of the belt carrying the flocks to prevent an excess of flock from accumulating on the belt 10 carrying the flocks which is now moving in a direction parallel to the conveyor. This is of particular advantage in cases where only a few of the flocks introduced on to the belt 10 through the distributor 19 can be re-used because of mixing of flock occurring in the accumulated excess, for example in cases where flocking is carried out with more than one type of flock. In addition, it has been found that particularly high flock density can be obtained on the moulding to be flocked by means of this countercurrent process because the moulding moving in a direction opposite to that in which the flocks are supplied is exposed to an increasing flock concentration towards the end of the flocking process. In other words, it undergoes intensive after-flocking.

It is possible by virtue of the invention to dispense with electrode grids or screens for charging the flocks which makes the plant as a whole easier to handle and keep clean. The flocks are charged by the field between the moulding and the belt carrying the flocks. All the field lines leading from the flock-carrying belt along which the flocks move, terminate at the moulding. As a result, there is no wastage of flocks through the sources of loss that occurred with prior art apparatus. Because the moulding to be flocked actually initiates the flocking process, charging is stopped when no more flocks are required.

The high voltage is only present in the flocking zone of the moulding. Elsewhere, the moulding is earthed, thus providing greater protection against accidental contact with voltage-carrying parts.

The invention is not limited to the flocking of hat stumps, but also covers the application of minute particles to mouldings of all kinds.

We claim:

1. Apparatus for applying particles such as flocks to mouldings against the influence of gravity which comprises at least two separate flocking zones, earthed conductive particle-carrying belt means mounted for corresponding travel through said zones, at least one molding insulated from earth and mounted for travel through said zones in spaced above and facing relation to the particular portion of the belt means thereat, and correspondingly separate means for supplying a different level of high voltage to the corresponding molding solely during passage of such molding through each said separate zone to produce a correspondingly different intensity electric field in each individual zone to cause particles on the particular portion of the belt means thereat to be applied against the influence of gravity to said molding in dependence upon the intensity of such field.

2. Apparatus according to claim 1 wherein said separate means for supplying said voltage include contact wheels and separate contact rail sections insulated from one another between the individual flocking zones.

3. Apparatus according to claim 1 wherein the distance between each said molding and the particular portion of said belt means in the individual flocking zones is adjustable.

4. Apparatus according to claim 1 wherein each said molding and said belt means in the individual flocking zones travel in the same direction.

5. Apparatus according to claim 1 wherein each said molding and said belt means in the individual flocking zones travel in opposite directions.

6. Apparatus according to claim 1 wherein a plurality of said moldings is provided, said moldings traveling via contact wheels successively through said zones along an endless contact rail composed of separate contact rail sections insulated from one another, including a corresponding current conducting rail section at each said zone connected with a corresponding said separate means for supplying said high voltage and including corresponding earthed rail sections remote from said zones, and wherein at least two belt means are provided for travel at separate zones from one another, and wherein the distance between each said molding and the particular portion of the belt means in the individual flocking zones is adjustable.

References Cited

UNITED STATES PATENTS

| | | | |
|---|---|---|---|
| 2,173,078 | 9/1939 | Meston | 118—638 XR |
| 2,686,733 | 8/1954 | Burridge et al. | 118—638 XR |
| 2,706,963 | 9/1955 | Hug | 118—621 |
| 2,884,341 | 4/1959 | Juvinall | 118—626 XR |
| 2,992,126 | 7/1961 | Roberts et al. | 118—622 XR |
| 3,248,253 | 4/1966 | Bareford et al. | 118—622 XR |

CHARLES A. WILLMUTH, *Primary Examiner.*

PETER FELDMAN, *Examiner.*